(12) United States Patent
Ruckel (10) Patent No.: US 8,753,055 B2
(45) Date of Patent: Jun. 17, 2014

(54) DEVICE FOR CONNECTING TWO COMPONENTS

(75) Inventor: Thomas Ruckel, Aub (DE)

(73) Assignee: Illinois Tool Works Inc., Glenview, IL (US)

( * ) Notice: Subject to any disclaimer, the term of this patent is extended or adjusted under 35 U.S.C. 154(b) by 118 days.

(21) Appl. No.: 13/392,612

(22) PCT Filed: Aug. 26, 2010

(86) PCT No.: PCT/EP2010/005226
§ 371 (c)(1),
(2), (4) Date: Feb. 27, 2012

(87) PCT Pub. No.: WO2011/023387
PCT Pub. Date: Mar. 3, 2011

(65) Prior Publication Data
US 2012/0155985 A1    Jun. 21, 2012

(30) Foreign Application Priority Data

Aug. 28, 2009 (DE) ............. 20 2009 011 986 U (51) Int. Cl.
*F16B 37/04* (2006.01)
(52) U.S. Cl.
USPC .......................................... 411/301; 411/182
(58) Field of Classification Search
USPC ......... 411/103, 108, 112, 114, 172–177, 178, 411/301; 24/397
See application file for complete search history.

(56) References Cited

U.S. PATENT DOCUMENTS

| | | | | |
|---|---|---|---|---|
| 4,704,059 A | * | 11/1987 | Nakama et al. | 411/182 |
| 4,762,437 A | * | 8/1988 | Mitomi | 403/11 |
| 5,373,611 A | * | 12/1994 | Murata | 24/297 |
| 5,816,762 A | * | 10/1998 | Miura et al. | 411/433 |
| 6,406,236 B1 | * | 6/2002 | Olson, Jr. | 411/61 |

(Continued)

FOREIGN PATENT DOCUMENTS

| | | |
|---|---|---|
| DE | 1575071 A1 | 11/1969 |
| DE | 19929016 A1 | 12/2000 |
| DE | 102005015033 A1 | 10/2006 |

OTHER PUBLICATIONS

ISR for PCT/EP2010/005226 dated Jan. 20, 2011.

*Primary Examiner* — Gary Estremsky
(74) *Attorney, Agent, or Firm* — Lowe Hauptman & Ham LLP (57) ABSTRACT

A device for connecting two components, comprising: an anchoring element (12) with an elongated anchoring section (14) with an elongated hollow space (16) and a head section (18), a fastening element (38) with a head (44) and a pin section (40) with an outer thread, at least four elastic locking feet (22, 24) being provided on the anchoring section, wherein two locking feet are provided on opposing sides of the anchoring section, respectively and the locking feet (22, 24) each have at least two locking shoulders (28, 30) arranged offset in the longitudinal direction of the anchoring section, for locking on openings of components of different thicknesses, and wherein opposing locking feet each have identically designed locking shoulders, which are however offset with respect to the locking shoulders of other opposing locking feet in the longitudinal direction of the anchoring section, and in the elongated hollow space of the anchoring section at least two diametrically opposed rows are provided, each with a plurality of fins (32) being directed radially inwards, wherein the axial distance between the fins (32) is not equal to the thread pitch of the pin section (40).

19 Claims, 5 Drawing Sheets

(56) References Cited

U.S. PATENT DOCUMENTS

| | | | |
|---|---|---|---|
| 7,066,701 B2 * | 6/2006 | Kovac | 411/433 |
| 7,322,784 B2 * | 1/2008 | Castro et al. | 411/433 |
| 7,669,807 B2 | 3/2010 | Stigler et al. | |
| 7,891,151 B2 * | 2/2011 | Sano | 52/506.05 |
| 2006/0034671 A1 * | 2/2006 | Castro et al. | 411/437 |
| 2008/0181748 A1 | 7/2008 | Rosemann et al. | |

* cited by examiner

DEVICE FOR CONNECTING TWO COMPONENTS

RELATED APPLICATIONS

The present application national phase of PCT/EP2010/005226 filed Aug. 26, 2010, and claims priority from German Application Number 202009011986.6 filed Aug. 28, 2009.

The invention relates to a device for connecting two components together in accordance with the preamble of claim 1. For example, a combination of a grommet and a metal screw are used to fasten a paneling part on a vehicle body in the automobile industry. In a first fastening step, the grommet is locked onto a corresponding opening of a first component. In a second step, the second component, which also has a corresponding opening, is placed on the grommet and the metal screw is screwed through the opening of the second component into the grommet. The second component is then held between the contact surface of the grommet and the bottom side of the screw head and the components are fastened onto each other in this manner. This fastening model offers high power intake and a high degree of tolerance equalization on the paneling part. Moreover, removal through unscrewing of the metal screw from the grommet is possible. Disadvantageous are comparatively high costs and complicated installation. Moreover, the grommet only has low flexibility with respect to different sheet thicknesses.

Starting from the explained state of the art, the object of the invention is thus to provide a device of the initially named type with which removal is possible with simple installation and high holding forces and high flexibility is simultaneously achieved with respect to different component thicknesses.

The invention solves this object through the subject of claim 1. Advantageous embodiments can be found in the dependent claims, the description and the figures.

For a device of the initially named type, the invention solves the object in that at least four elastic locking feet running in the longitudinal direction of the anchoring section and at least in sections perpendicular to the longitudinal direction of the anchoring section are designed on the anchoring section, wherein two locking feet are provided on opposing sides of the anchoring section respectively, that the locking feet each comprise at least two locking shoulders arranged offset in the longitudinal direction of the anchoring section, with which the locking feet can be locked on openings of components of different thicknesses, and wherein opposing locking feet comprise identical locking shoulders, respectively, which are however offset with respect to the locking shoulders of other opposing locking feet in the longitudinal direction of the anchoring section, and that in the elongated hollow space of the anchoring section at least two diametrically opposed rows are each provided with a plurality of fins being directed radially inwards and being distanced in the axial direction for holding the pin thread surface of the fastening element, wherein the axial distance between the fins is not equal to the (simple) thread pitch of the pin section.

The device serves in particular to fasten flat components to each other, each of which has an opening corresponding to the anchoring element or respectively the fastening element. The components can be for example a car body sheet and an underbody paneling part of an automobile. The anchoring element according to the invention is for example a dowel or a grommet. The elongated hollow space designed in it can be e.g. cylindrical. The head section is designed appendage- or flange-shaped on one end of the anchoring element and projects outwards (in the radial direction) over the anchoring section. The fastening element can be a screw. It thereby concerns in particular a free, separate part, which is not permanently welded with a component like a threaded bolt. The fastening element has a tool holder on its head, which can be designed in any manner, for example like a hexagon, Torx or the like. A tool for turning the screw can engage in this tool holder. Accordingly, the anchoring element can be a nut. The locking feet of the anchoring element are in particular in the area of their (upper) end facing the head section at least partially free and elastically moveable with respect to the other anchoring element. On their opposite (lower) end, they can be arranged permanently on the anchoring section so that only their free end is moveable.

Locking shoulders or locking levels are designed on the (upper) end of the locking feet facing the head section. The locking shoulders of the opposing locking feet are designed identical. The shoulders or levels each run perpendicular to the axial direction of the elongated hollow space, wherein the levels lead inwards in the direction of the head section (in the direction of the hollow space). Thus, the further away the levels are located from the head section, the further away they also removed from the hollow space. There is a free space, in which a first component can be received in the locked state, between each top side of the locking shoulders and each bottom side of the head section of the anchoring element. The distance between the top side of the respective locking shoulder and the bottom side of the head section thereby defines the thickness of the component to be locked with the anchoring element. In particular, more than two locking shoulders can be provided on each locking foot. Several locking shoulders increase the flexibility with respect to the component strengths that can be used with the device. Nonetheless, only a certain component thickness range can be contained in this manner since the locking feet must be elastic enough for insertion of the component but simultaneously sufficiently stiff for secure locking on the component. The more locking shoulders are provided on a locking foot, the more flexible the locking foot must be. According to the invention, at least some of the non-opposing locking feet must thus have locking shoulders designed with different heights. In this manner, either the one pair of opposing locking feet or the other pair of opposing locking feet locks on the component opening depending on the component strength. A greater flexibility with respect to different component strengths is thereby achieved. Overall, the locking shoulders of the two different locking feet with their top side can together define regular continuous distances to the bottom side of the head section. The locking feet with differently designed locking feet there end at a different distance from the bottom side of the head section.

According to the invention, at least two rows of fins progressing in the axial direction of the hollow space are still provided. Two diametrically opposed fins each extend from the same radial plane. The fins are elastic at least in the axial direction of the elongated hollow space. In the unformed state, they have an axial distance not equal to the thread pitch of the pin section. In relation to the thread of the fastening element, the fins are thus designed such that the fastening element can be pushed into the hollow space, wherein the fins first deform and then lock into the thread pitches of the pin thread. The fastening element is thereby held securely in the hollow space. It cannot be pulled back out of the hollow space. A complicated screwing in of the fastening element is thereby not required. However, the fastening element can be screwed out of the hollow space. In the state of the fastening element inserted into the hollow space, this prevents a pivoting of the locking feet inwards and thus a loosening of the locking of the anchoring element from the component.

In order to connect two components with the device according to the invention, the anchoring element with the anchoring section is first pushed into a corresponding opening of a first component. The locking feet are thereby pushed inwards in the area of their end facing the head section and the lowermost locking shoulders lying furthest outside in the radial direction are the first to make it through the opening of the component. Depending on the thickness of the component, further locking shoulders make their way through the component opening in the case of further pressing of the anchoring element into the opening. After each passage of a locking shoulder through the component opening, the corresponding locking feet move a little bit further outward due to their elastic pretensioning until the locking feet opposing the locking shoulders engage behind the component opening, the distance of which from the bottom side of the head section is just the same as that of the component thickness. These locking shoulders could be designed both on the first opposing pair of locking feet as well as on the second opposing pair of locking feet. Further locking shoulders could then no longer make their way through the opening. In this state, the anchoring element is securely locked on the first component. A second component also with a corresponding opening is then attached to the contact surface formed by the top side of the head section of the anchoring element such that the component opening is flush with the inlet opening of the elongated hollow space. Then, in order to permanently connect the two components, the fastening element is pushed through the opening of the second component into the elongated hollow space, wherein the fins are first bent in the insertion direction of the pin section and then lock in the thread pitch of the fastening element. In the fully pushed-in state, the second component is held securely between the contact surface of the anchoring element and the bottom side of the head of the fastening element. Due to the fins, the fastening element cannot be pulled out of the elongated hollow space. The fastening element simultaneously ensures that the locking feet cannot be pushed inward so that the locking of the anchoring element on the first component cannot be released.

According to the invention, high holding forces are thereby achieved with simple, less power-consuming and fast installation, wherein removal is also possible. The multifunctional part according to the invention allows great flexibility with respect to the fastening of components of different thickness together.

At least some of the fins, in particular all fins, can have a support section, which is provided on the side of the fins facing the insertion opening of the hollow space. During insertion of the fastening element into the hollow space, the fins can freely move elastically together with the respective support section in the insertion direction of the fastening element. In contrast, in the unloaded state, the support sections of the fins rest against an inside of the locking feet carrying the fins so that they securely prevent the fastening element from being pulled out of the hollow space like a tie bar.

In accordance with one embodiment, the axial distance between the fins can be equal to a multiple of the threaded pitch of the pin section, in particular equal to double the threaded pitch of the pin section. It was determined that the insertion and removal of the fastening element is particularly simple in the case of such a fin distance.

However, according to another alternative embodiment, it is also possible that the axial distance between the fins is not equal to a multiple of the threaded pitch of the pin section. According to another embodiment referring to this, the axial distance of the fins can mainly be 1.5 times that of the threaded pitch of the pin section. In order to further improve the insertion and removal of the fastening element, the fins in diametrically opposed rows can each be offset with respect to each other in the longitudinal direction of the anchoring section. The fins can be tilted in the insertion direction of the pin section. In this manner, the installation of the fastening element is further simplified and simultaneously achieves a particularly high holding force. The fins can be designed in particular as described in DE 199 57 977 A1. According to another embodiment, the fins can each extend into the hollow space starting from an inside of the locking feet facing the hollow space. The fins are arranged on at least two opposing locking feet. In particular, just two rows of fins can also be provided. The fins can then be designed in particular on the longer locking feet, that is on the locking feet, the locking shoulders of which are closer to the bottom side of the head section. But it is also possible to provide fins on all, for example on all four, locking feet.

At least the locking feet with fins can have at least one recess extending in the longitudinal direction of the anchoring section, wherein one fin of each row extends starting from a delimiting wall of the recess closest to the head section. The fin extending from the boundary of the recess can be the fin of a row closest to the head section. The installation is thereby further simplified since in particular the uppermost fins more easily deform during insertion of the screw. Furthermore, at least the locking feet with fins can be tapered at least from the connection of the fin of a row closed to the head section. The locking feet are thereby thinner than in their other area already at the connection of the highest fin. The tapering ensures an elasticity of the upper section of the locking feet, wherein the tapering ends of the locking feet are in particular free for a movement perpendicular to the axial direction of the hollow space. At the same time, a longer fin design is also possible so that the lever action during insertion of the screw is increased. This further facilitates installation in that in particular the uppermost fins can be pushed inward with less force. The fastening element can thus be brought particularly easily into a first installation position. At the same time, it protects the locking feet from pivoting inwards and thus a releasing of the lock from the component.

According to another embodiment, the at least four elastic locking feet can be designed on just two opposing sides of the anchoring section. Thus, elastic locking feet are provided in particular on just two opposing sides of the anchoring section. For example, two or three locking feet can thereby be arranged on each of the two sides, wherein two locking feet lie opposite each other on each side. The opposing locking feet in turn have similarly designed locking shoulders, wherein at least two of the opposing locking feet pairs have offset locking shoulders in the axial direction of the anchoring section. The production and installation of the device according to the invention is simplified with this embodiment.

It is also possible that the at least four elastic locking feet are designed on at least four sides of the anchoring section, of which two sides lie opposite each other. In this embodiment, the anchoring section thus has at least four sides and locking feet are design on each of the four sides. Two locking feet are in turn arranged opposite each other in pairs. Particularly high device holding forces are achieved with this embodiment.

In accordance with another embodiment, the head section on its bottom side facing away from the contact surface can have at least one, in particular several, spring elements, which pretensions or respectively pretension the anchoring element in the state inserted into the opening of the first component and locked on the opening away from the first component. The spring element(s) are elastic and in particular designed such that they are elastically deformed when the anchoring section is completely inserted and locked. Due to their reset force, they push the anchoring element away from the component. In this manner, the locking shoulders of the anchoring section are pushed against the associated contract surface of the component. The holding forces of the device are thereby in turn increased.

The thread profile can be optimized for the present application. In particular, the thread flanks of the pin section in the insertion direction of the pin section can have a conical front thread surface with a conical angle with respect to the longitudinal axis of the pin section of less than 45°. Furthermore, the thread flanks of the pin section in the insertion direction of the pin section can have a rear thread surface with an angle with respect to the longitudinal axis of the pin section of at least 80°, preferably approximately 90°. The thread then has a pronounced contact surface opposite the insertion direction of the screw (i.e. in the pull direction or loading direction), which prevents the screw from being pulled out of the hollow space. At the same time, the thread in the insertion direction of the screw has a comparatively pointy conical surface, which simplifies the pushing of the screw into the hollow space.

The anchoring element and/or the fastening element can be made of a plastic. The costs of the device are thereby reduced. Low weight and high flexibility with respect to the design simultaneously result. The installation is also further simplified. The production of the anchoring element and/or the fastening element can take place e.g. in an injection molding process. However, a metal screw is also conceivable as the fastening element.

The invention also relates to a device according to the invention in the state connecting two components with each other, wherein the anchoring element with its anchoring section is put through an opening of the first component and is locked on the component opening, wherein the second component is attached to the contact surface of the head section of the anchoring element such that an opening of the second component is flush with the inlet opening of the hollow space of the anchoring element, and wherein the fastening element with its pin section is pushed into the hollow space so that the second component is held between the head of the fastening element and the contact surface of the anchoring element.

One exemplary embodiment of the invention is explained below in greater detail using figures. The drawings schematically show in.

Figure 1:
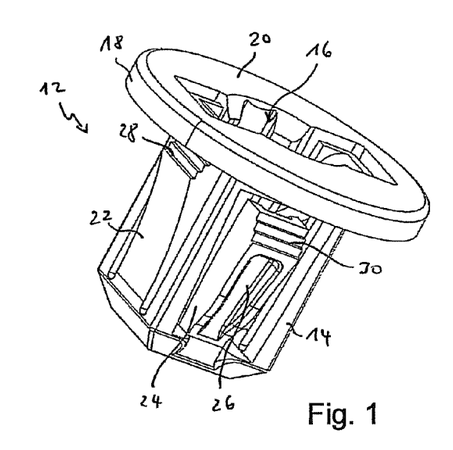
FIG. 1 an anchoring element according to the invention in a perspective view, FIG. 2 a vertical sectional view of the anchoring element from FIG. 1, FIG. 3 a fastening element according to the invention in a perspective view, FIG. 4 the anchoring element from FIG. 1 in a first operating position in a perspective view, FIG. 5 the device according to the invention in another operating position in a perspective view, FIG. 6 the device according to the invention in another operating position in a perspective view, FIG. 7 the device according to the invention in another operating position in a perspective view, FIG. 8 the representation from FIG. 7 in another perspective view, FIG. 9 a sectional view of the fastening element according to the invention in a vertical cut, FIG. 10 a vertical sectional view of an anchoring element according to the invention in accordance with another exemplary embodiment, FIG. 11 a view according to the view from FIG. 6 with the anchoring element shown in FIG. 10, FIG. 12 a vertical sectional view of an anchoring element according to the invention in accordance with another exemplary embodiment, FIG. 13 a first perspective view of the anchoring element from FIG. 12 and FIG. 14 a second perspective view of the anchoring element from FIG. 12.
Figure 2:
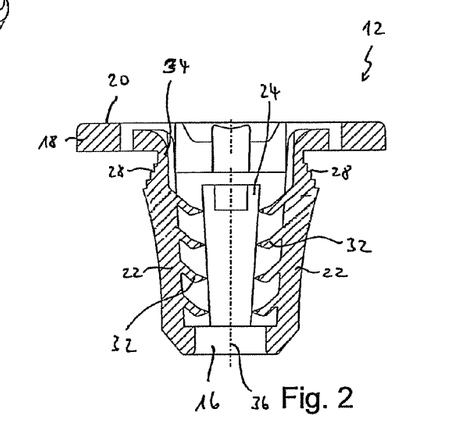

If not specified otherwise, the same reference numbers are used for the same objects in the figures. FIGS. 1 and 2 show an anchoring element 12 according to the invention, at hand a grommet 12, which was made of plastic in an injection molding process. The anchoring element 12 has a rectangular, elongated anchoring section 14, in which an elongated, mainly cylindrical hollow space 16 is designed. A flange-like, circular (when seen from above) head section 18, the top side 20 of which forms a contact surface for a component, is designed on the top end of the anchoring section 14 in FIGS. 1 and 2. Four locking feet running in its longitudinal direction, of which only two locking feet 22, 24 can be identified in FIG. 1, are designed on the anchoring section 14. The locking feet are each permanently attached to the anchoring section on their bottom end in FIGS. 1 and 2, whereas their top end is at least partially free so that the locking feet 22, 24 are elastically movable in the area of their upper end perpendicular to the longitudinal direction of the hollow space 16. In particular, the locking feet 22, 24 can be pushed from their resting position shown in FIG. 1 inwards in the direction of the elongated hollow space 16. The locked feet 24 are shorter than the locking feet 22. Respectively, two locking feet 22, 24 are designed opposite each other, wherein opposing locking feet are designed identically in pairs. However, the two locking feet 22, 24 shown in FIG. 1 of a pair differ from each other. For one, the somewhat shorter locking foot 24 has an elongated recess 26, which increases the elasticity of the locking foot 24 and saves material. Moreover, it can be seen that the locking feet 22, 24 each have stair-like progressing locking shoulders 28, 30 in the area of their upper end. In the example shown, each of the locking feet 22, 24 have three locking shoulders 28, 30. It can be seen that the locking shoulders 28, 30 of the two locking feet 22, 24 are arranged offset from each other in the longitudinal direction of the hollow space 16. The locking shoulders 28, 30 of the two different pairs of locking feet 22, 24 thereby form continuously together even distances from the bottom side of the head section 18. It can be seen in FIG. 2 that each of the opposing, longer locking feet 22 have on their inside facing the hollow space 16 a row of four fins 32 facing radially inwards in the example shown and tilted downwards in the representation in FIG. 2. The two rows with fins are diametrically opposed, wherein opposing fins 32 extend starting from the same radial plane. The fins 32 are axially distanced. In the example shown, they are only designed on the longer locking feet 22. In contrast, the shorter locking feet 24 do not have any fins. It can also be seen in the representation in FIG. 2 that the locking feet 22 taper in the area of their upper end 34 so that they can be moved accordingly perpendicular to the longitudinal axis of the hollow space 16 shown in FIG. 2 with reference number 36.

Figure 3:
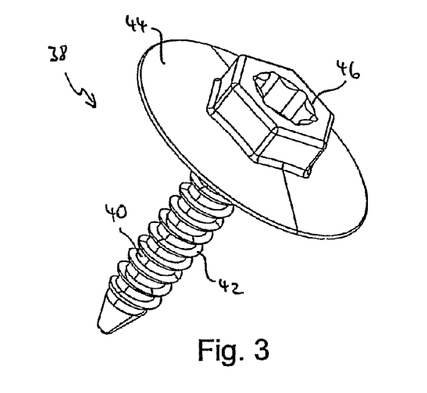

FIG. 3 shows a fastening element 38 according to the invention, at hand a screw 38, with a pin section 40 with an outer thread 42 and a head 44 designed on one end of the pin section 40. The fastening element 38 was also made of a plastic in an injection molding process. When seen from above, the head 44 has a circular shape with a central tool holder 46, an internal hexagon 46 in the example shown. The axial distance of the fins 32 of the grommet 12 is thereby not equal to the thread pitch of the thread 42 of the pin section 40. In particular, the axial distance in the example shown is approximately 1.5 times the thread pitch of the pin section.

Figure 4:
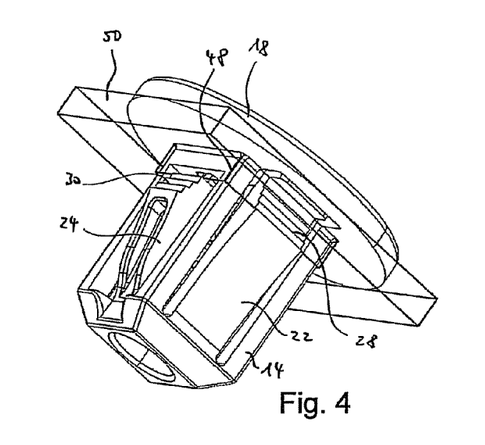
Figure 5:
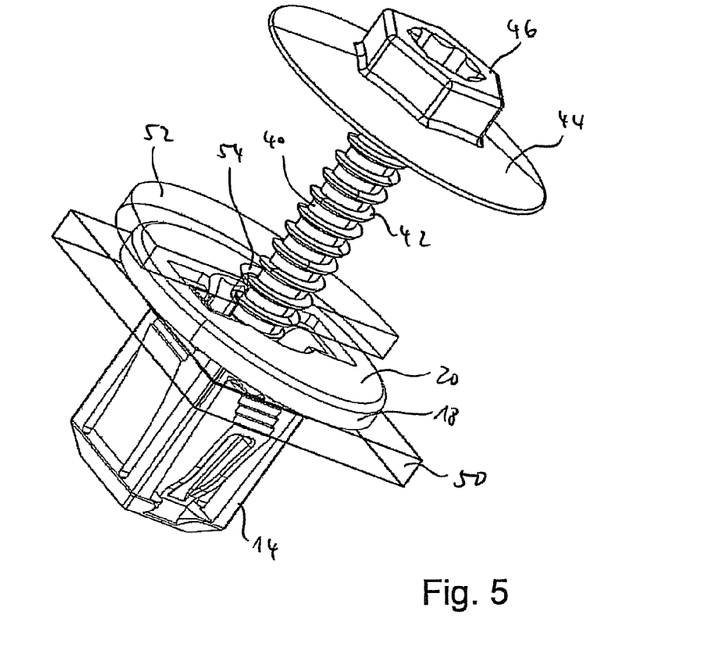
Figure 6:
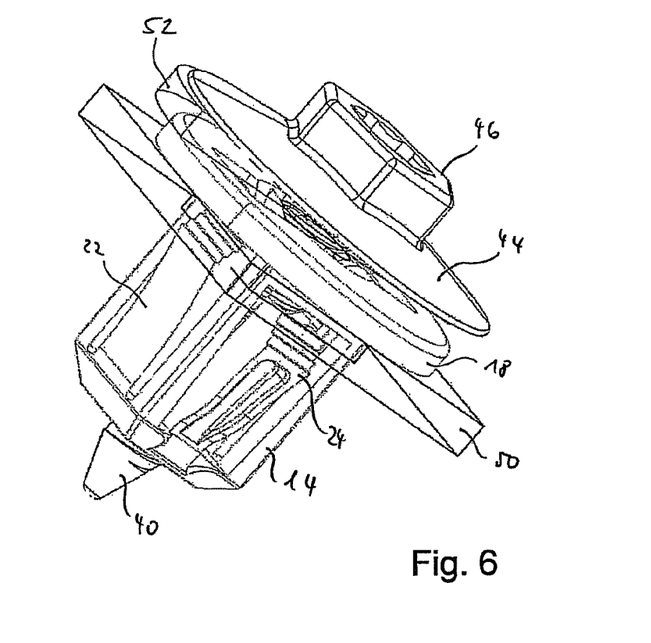
Figure 7:
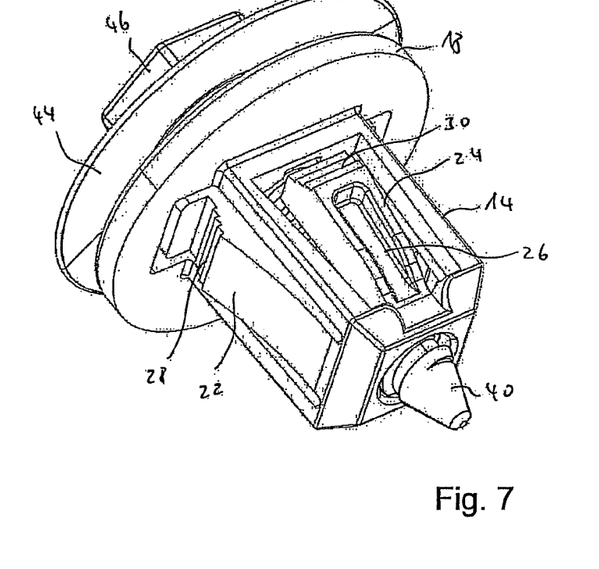
Figure 8:
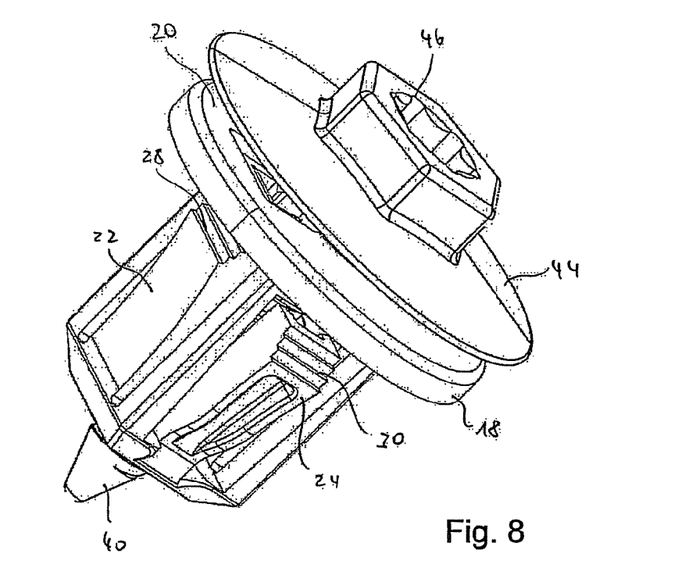

The function of the device is as follows: The anchoring element 12 with its anchoring section 14 is first inserted into a suitable, in the shown example, rectangular opening 48 of a first flat component 50 represented schematically in FIG. 4. The component 50 can be for example an underbody sheet of an automobile. To illustrate this, component 50 is shown transparently in FIG. 4. When the anchoring section 14 is inserted, the locking feet 22, 24 are pushed inward, wherein the locking shoulders 28, 30 penetrate the component opening 48 one after the other, wherein the locking feet move outward again piece by piece until component 50 rests against the bottom side of the head section 18. In the example shown, the anchoring section 14 is locked with the lowermost locking shoulder 28 of the longer locking feet 22 on the component opening 48. The shorter locking feet 24 have in contrast fully penetrated the component opening 48 and have moved again in the radial direction completely outside. In this state, the anchoring element 12 is securely locked on the component 50. In the next step, as shown in FIG. 5, a second component 52, which is shown transparent and only in sections in FIG. 5 for illustrative purposes, is placed from above onto the contract surface 20 of the head section 18 of the anchoring element 12. The second component 52 can be for example an underbody paneling part for an automobile. It has a circular opening 52 in the example shown, with which it is flush with the inlet opening of the elongated hollow space 16. The screw 38 with the pin section 40 is then pushed through the opening 54 of the second component 52 into the elongated hollow space 16 up to the fully installed state shown in FIG. 6. While pushing in the screw 38, the fins 32 are first pushed downwards in the insertion direction and then lock in the thread pitches of the thread 42. Thus, the screw 38 cannot be pulled back out of the hollow space 16 in the state shown in FIG. 6. The screw 38 with its threaded section 40 simultaneously ensures that the locking feet 22, 24 cannot be pushed inward. Thus, the locking of the anchoring element 12 on the first component 50 cannot be accidently released. In this state, the two components 50, 52 are securely connected with each other. At the same time, the screw 38 can be unscrewed again from the anchoring element 14 through engagement of a suitable tool into the tool holder 46 so that disassembly is possible. FIGS. 7 and 8 show the device according to the invention in the fully installed state in two other perspective views, without the two components for illustrative purposes.

Figure 9:
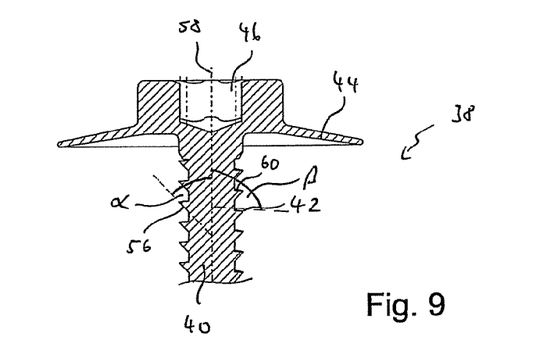

FIG. 9 shows a cross-section of sections of the screw 38 according to the invention. It can be seen that the thread flanks of the pin section 40 in the insertion direction of the pin section 40 into the hollow space 16 each have a conical front thread surface 56, which in the example shown has a conical angle α with respect to the longitudinal axis 58 of the pin section 40 of somewhat less than 45°. Moreover, the thread flanks of the pin section 40 in the insertion direction of the pin section 40 each have a rear thread surface 60 with an angle β with respect to the longitudinal axis 58 of approximately 90°.

Figure 10:
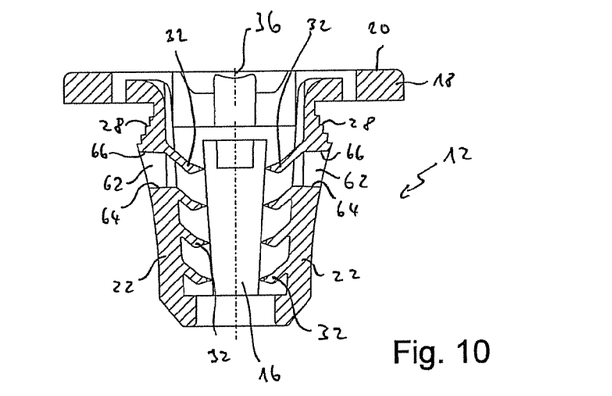
Figure 11:
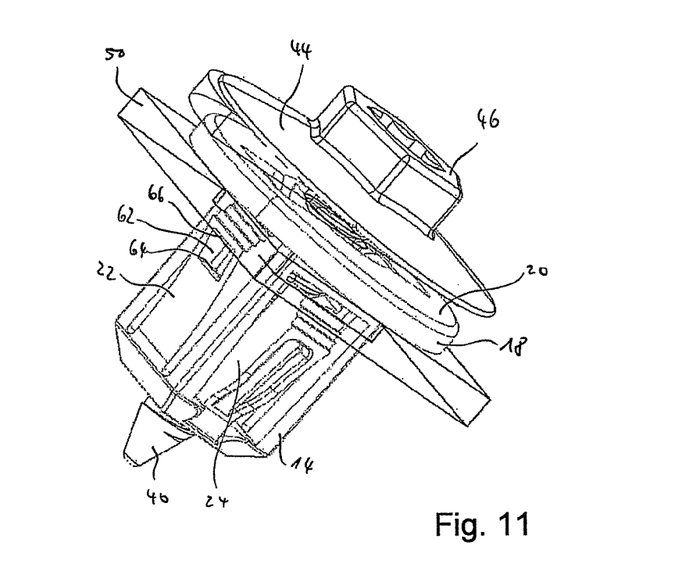

FIG. 10 shows a vertical sectional view of the anchoring element 12 according to the invention according to another exemplary embodiment. This anchoring element 12 mainly corresponds with the anchoring element 12 shown in FIGS. 1 and 2. However, in contrast, the locking feet 22 provided with fins 32 each have an approximately square recess 62 extending in the longitudinal direction of the anchoring section 12. The recesses 62 are each bordered on the bottom or top by a lower delimiting wall 64 and an upper delimiting wall 66. The uppermost fin 32 of the fin row extends from the top delimiting wall 66. FIG. 11 shows a representation analogous to the representation in FIG. 6, wherein however the anchoring element 12 is provided according to the exemplary embodiment from FIG. 10.

Figures 12, 13:
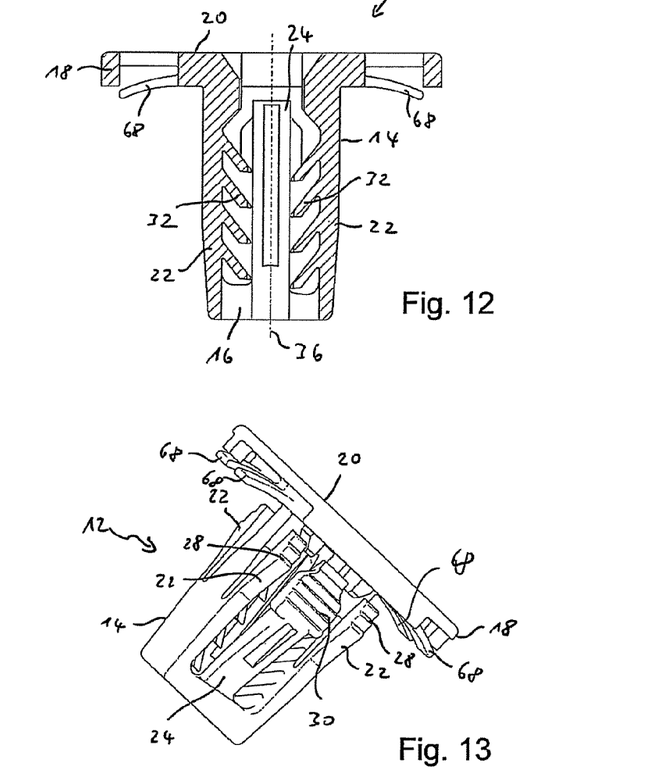
Figure 14:
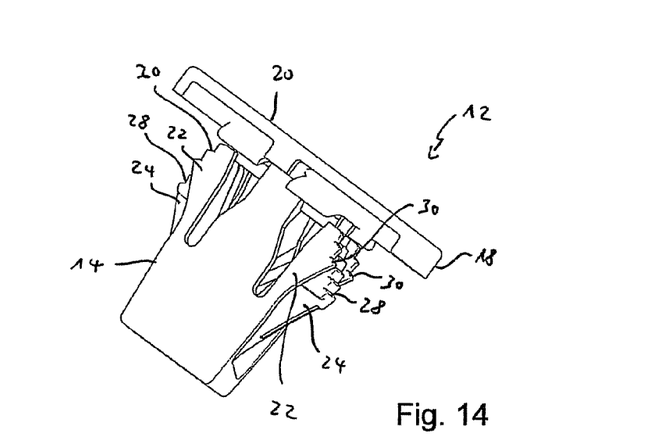

FIGS. 12 through 14 show another exemplary embodiment of an anchoring element 12 according to the invention in different views. The anchoring element in FIGS. 12 through 14 mainly corresponds with the anchoring element shown in the previous figures. It can in particular be used for example with the fastening element 38 shown in FIG. 3. In contrast to the anchoring elements in the previous examples, elastic locking feet 22, 24 with locking shoulders 28, 30 are only designed on two opposing sides of the anchoring element 12 in the exemplary embodiment in FIGS. 12 through 14. Three locking feet 22, 24 are thereby arranged on each of the two sides provided with locking feet. Each middle locking foot 24 differs thereby from the two outer locking feet 22, which are designed the same. In turn, opposing locking feet 22, 24 on the two sides of the anchoring section 14 are each designed the same. The two outer lying locking feet 22 on one side of the anchoring section 14 differ from the middle locking foot 24 with respect to the locking shoulders 28, 30. As in the exemplary embodiments explained above, at least some of the locking shoulders 28, 30 are in turn offset from each other in the axial direction of the anchoring section 14.

Another difference in the anchoring element 12 from FIGS. 12 through 14 compared to those anchoring elements 12 shown in the previous figures consists in the design of the spring elements 68 on the head section 18 on its bottom side facing away from the contact surface 20. As can be seen in particular in FIG. 13, two elastic spring elements 68 are arranged on two opposing sides of the head section 18, respectively. In the state of the anchoring element 12 inserted into the opening 48 of the first component 50 and locked on the opening 48, these spring elements 68 in FIG. 12 are elastically deformed upwards. In the locked state, they thus pretension the anchoring element 12, in a direction away from the first component 50.

Another difference between the anchoring element 12 shown in FIGS. 12 through 14 and the anchoring elements 12 shown in the previous figures is the design of the fins 32. In the example shown, the axial distance between the fins 32 is equal to a multiple of the threaded pitch of the associated pin section 40, in particular equal to double the threaded pitch of the pin section 40. Moreover, the fins 32 of the diametrically opposed fin rows are each offset from each other in the axial direction of the anchoring section 14, as can be seen in particular in FIG. 12.

The invention claimed is:

1. A device for connecting two components, comprising:
   an anchoring element with an elongated anchoring section with an elongated hollow space and a head section provided on one end of the anchoring section, wherein the anchoring section is insertable into an opening of a first component and lockable on the opening, and wherein the head section forms a contact surface for a second component on its side facing away from the anchoring section, and
   a fastening element with a head and a pin section extending from the head with an outer thread, wherein the pin section is insertable into the elongated hollow space of the anchoring element and can be fastened in the same, characterized in that
   at least four elastic locking feet are provided on the anchoring section extending in the longitudinal direction of the anchoring section and perpendicular to the longitudinal direction of the anchoring section at least in sections, wherein two locking feet are provided on opposing sides of the anchoring section, respectively, the locking feet each have at least two locking shoulders arranged offset in the longitudinal direction of the anchoring section, with which the locking feet can be locked on openings of components of different thicknesses, and wherein opposing locking feet each have identically designed locking shoulders, which are however offset with respect to the locking shoulders of other opposing locking feet in the longitudinal direction of the anchoring section, and in the elongated hollow space of the anchoring section at least two diametrically opposed rows are provided, each with a plurality of fins being directed radially inwards and being distanced in the axial direction for holding the pin section of the fastening element, wherein the axial distance between the fins is not equal to the thread pitch of the pin section;

wherein for respective feet, the respective at least two locking shoulders have outer peripheries in the lateral direction that are offset, wherein the respective outer peripheries extend further from a center of the anchoring element with distance from the head section of the anchoring element.

2. The device according to claim 1, characterized in that the axial distance between the fins is equal to a multiple of the threaded pitch of the pin section, in particular equal to double the threaded pitch of the pin section.

3. The device according to claim 1, characterized in that the axial distance between the fins is not equal to a multiple of the threaded pitch of the pin section.

4. The device according to claim 3, characterized in that the axial distance between the fins is mainly 1.5 times the threaded pitch of the pin section.

5. The device according to claim 1, characterized in that the fins of diametrically opposed rows are each offset from each other in the longitudinal direction of the anchoring section.

6. The device according to claim 1, characterized in that the fins are tilted in the insertion direction of the pin section.

7. The device according to claim 1, characterized in that the fins can each extend into the hollow space starting from an inside of the locking feet facing the hollow space.

8. The device according to claim 7, characterized in that at least the locking feet with fins have at least one recess extending in the longitudinal direction of the anchoring section, wherein one fin of each row extends starting from a delimiting wall of the recess closest to the head section.

9. The device according to claim 8, characterized in that the fin extending from the delimiting wall of the recess is the fin of a row closest to the head section.

10. The device according to claim 1, characterized in that at least the locking feet with fins taper at least starting from the connection of the fin of a row closest to the head section.

11. The device according to claim 1, characterized in that the at least four elastic locking feet are designed on only two opposing sides of the anchoring section.

12. The device according to claim 1, characterized in that the at least four elastic locking feet are designed on at least four sides of the anchoring section of which two sides lie opposite each other, respectively.

13. The device according to claim 1, characterized in that the head section on its bottom side facing away from the contact surface has at least one spring element, which pretensions the anchoring element in the state inserted into the opening of the first component and locked on the opening away from the first component.

14. The device according to claim 1, characterized in that the thread flanks of the pin section in the insertion direction of the pin section have a conical front thread surface with a conical angle with respect to the longitudinal axis of the pin section of less than 45°.

15. The device according to claim 1, characterized in that the thread flanks of the pin section in the insertion direction of the pin section have a rear thread surface with an angle with respect to the longitudinal axis of the pin section of at least 80°, preferably approximately 90°.

16. The device according to claim 1, wherein for respective feet, the respective at least two locking shoulders have outer peripheries in the lateral direction that are offset.

17. The device according to claim 1, wherein for respective feet, the respective at least two locking shoulders have outer peripheries in the lateral direction that are offset.

18. The device according to claim 1, wherein for respective feet, the respective at least two locking shoulders form steps, wherein for a given direction along the steps, the steps both lead away from the head section of the anchoring element and lead away from a center of the anchoring element.

19. The device according to claim 1, wherein for respective feet, the respective at least two locking shoulders face the head section of the anchoring element.

* * * * *